(12) United States Patent
Nojima et al.

(10) Patent No.: US 9,075,949 B2
(45) Date of Patent: Jul. 7, 2015

(54) SUPPORTING DESIGN OF ELECTRONIC EQUIPMENT

(71) Applicant: CANON KABUSHIKI KAISHA, Tokyo (JP)

(72) Inventors: Toshitaka Nojima, Tokyo (JP); Toshisato Sadamatsu, Kawasaki (JP); Shinichi Hama, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 13/682,365

(22) Filed: Nov. 20, 2012

(65) Prior Publication Data

US 2013/0145334 A1 Jun. 6, 2013

(30) Foreign Application Priority Data

Dec. 2, 2011 (JP) .................................. 2011-265051

(51) Int. Cl.
*G06F 17/50* (2006.01)

(52) U.S. Cl.
CPC ........ *G06F 17/5081* (2013.01); *G06F 2217/82* (2013.01)

(58) Field of Classification Search
CPC .................. G06F 17/5081; G06F 2217/82
USPC ................................................. 716/115, 137
See application file for complete search history.

(56) References Cited

U.S. PATENT DOCUMENTS

| 6,721,930 | B2* | 4/2004 | Sasaki et al. ................. 716/113 |
| 8,201,133 | B2* | 6/2012 | Cases et al. .................. 716/137 |
| 2004/0143804 | A1* | 7/2004 | Ueno et al. ........................ 716/4 |
| 2005/0114807 | A1* | 5/2005 | Gasparik ........................... 716/5 |
| 2011/0023005 | A1* | 1/2011 | Tsubamoto .................. 716/137 |
| 2011/0231809 | A1* | 9/2011 | Sakata et al. ................ 716/129 |
| 2012/0159411 | A1 | 6/2012 | Nojima et al. |

FOREIGN PATENT DOCUMENTS

JP 4082906 B 4/2008

* cited by examiner

*Primary Examiner* — Nha Nguyen
(74) *Attorney, Agent, or Firm* — Fitzpatrick, Cella, Harper & Scinto

(57) ABSTRACT

Design information including layout information of a print circuit board associated with an electronic equipment, and component information is acquired, and a verification condition associated with crosstalk noise is input. Information of signal lines which should verify influence of the crosstalk noise are extracted from the design information. Based on the verification condition, a signal line, which crosses or overlaps a signal line other than the signal line corresponding to the extracted information planerly viewed from a laminating direction of layers of the print circuit board, of the signal lines corresponding to the extracted information is detected as a victim wiring.

8 Claims, 14 Drawing Sheets

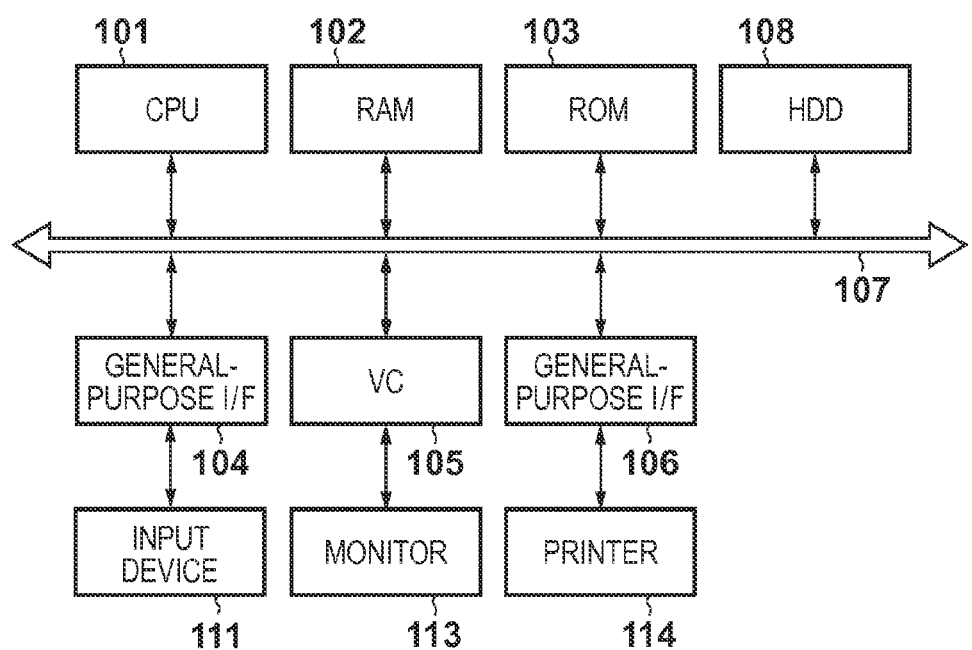
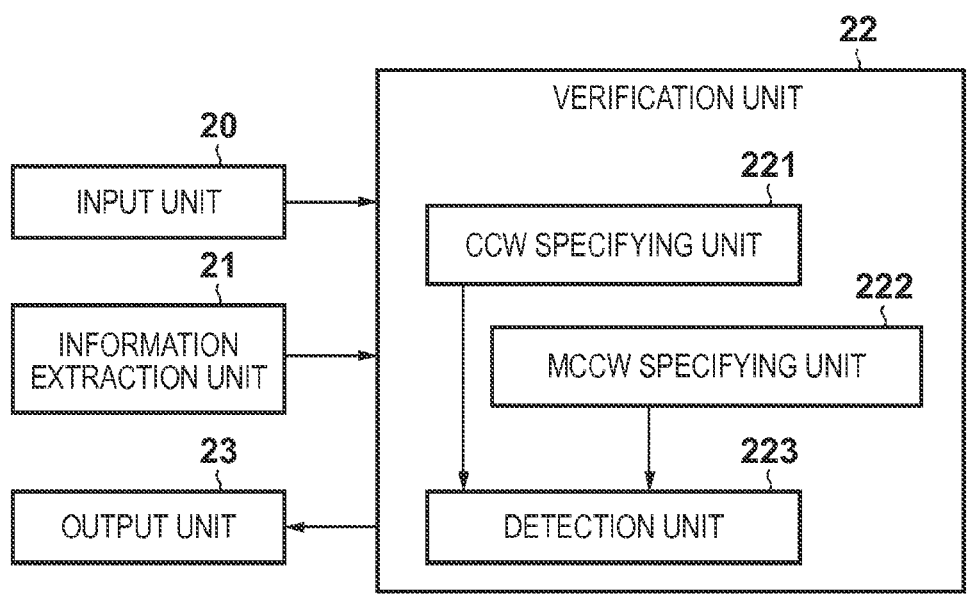

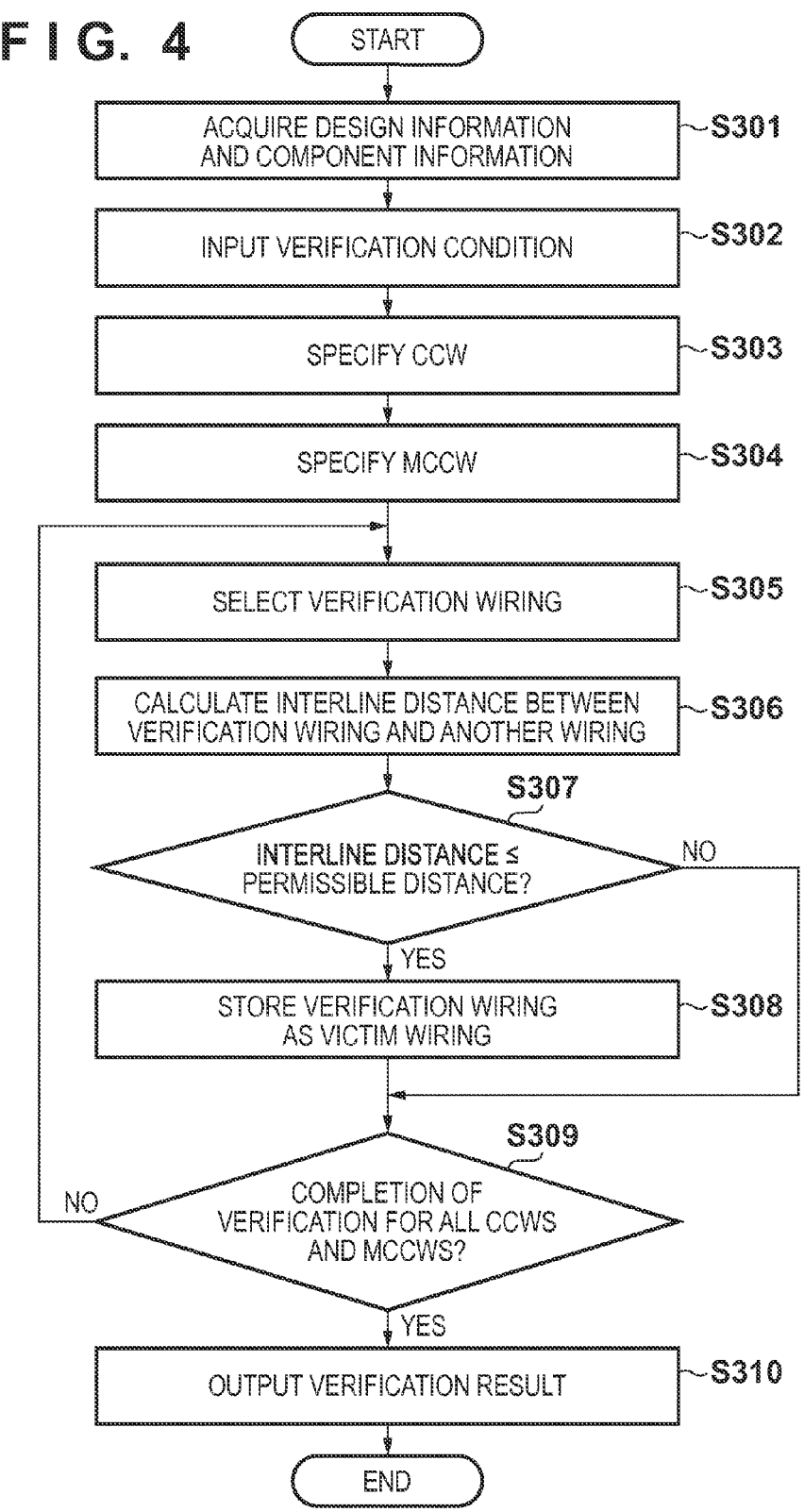

| VICTIM WIRING | | | ANOTHER WIRING | | | INTERLINE DISTANCE |
|---|---|---|---|---|---|---|
| SIGNAL NAME | POSITION COORDINATES | WIRING LAYER | SIGNAL NAME | POSITION COORDINATES | WIRING LAYER | |
| RST0 | (5.5, 3.5) | TOP | NET0 | (5.5, 3.75) | TOP | 0.25mm |
| CNT1 | (10.2, 5.3) | TOP | NET1 | (10.2, 5.3) | SECOND LAYER | 0.1mm |

F I G. 12
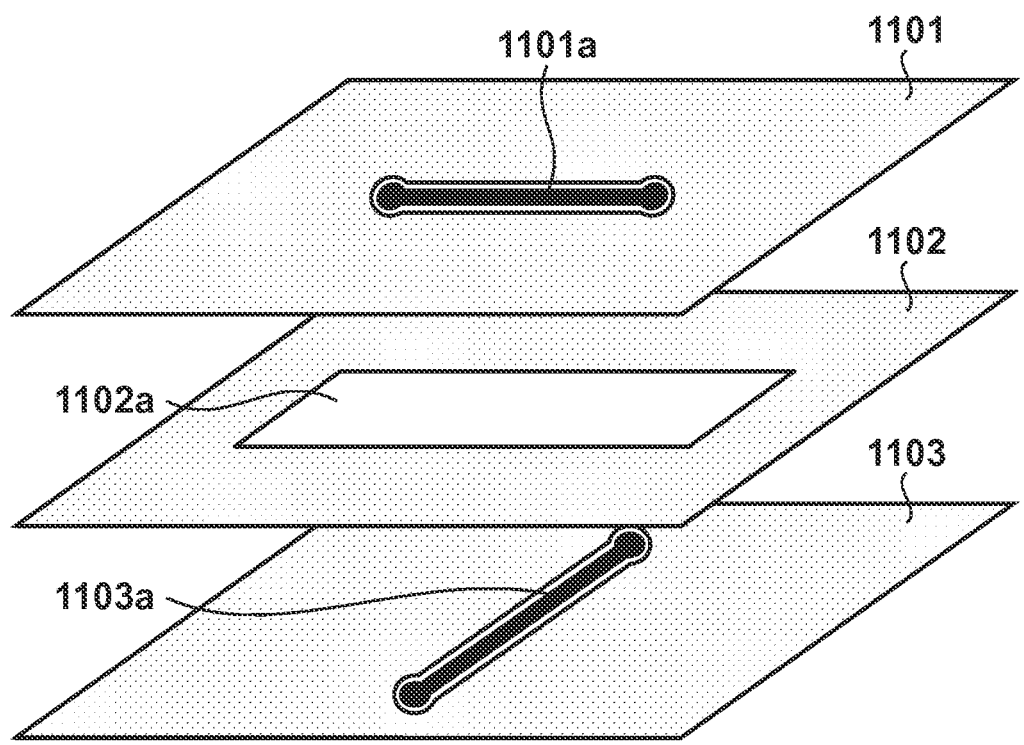

F I G. 14B

| VICTIM WIRING | | ANOTHER WIRING | | | VIOLATION TYPE | INTERLINE DISTANCE | NEIGHBOR-ING LENGTH | DETERMINATION FOR NEIGBORING LENGTH |
|---|---|---|---|---|---|---|---|---|
| SIGNAL NAME | WIRING LAYER | POSITION COORDINATES | SIGNAL NAME | POSITION COORDINATES | WIRING LAYER | | | |
| RST00 | TOP | (5.5, 3.5) | NET00 | (5.5, 3.75) | TOP | NEIGHBOR-ING | 0.25mm | 1.5mm | NG |
| CNT11 | TOP | (10.2, 5.3) | NET11 | (10.2, 5.3) | SECOND LAYER | CROSSING | — | — | — |
| CNT11 | TOP | (11.1, 5.3) | NET00 | (11.1, 5.3) | SECOND LAYER | CROSSING | — | — | — |
| RST01 | SECOND LAYER | (12.5, 9.8) | NET21 | (12.7, 9.9) | TOP | NEIGHBOR-ING | 0.22mm | 0.5mm | GOOD |

SUPPORTING DESIGN OF ELECTRONIC EQUIPMENT

BACKGROUND OF THE INVENTION

1. Field of the Invention

The present invention relates to design supporting of an electronic equipment.

2. Description of the Related Art

When signal lines extend parallel to each other, and their parallel distance is large, their signals influence each other, thus generating noise. Such noise is called "crosstalk noise", causes a malfunction of a semiconductor device such as an IC (integrate circuit) or LSI (large-scale integration), and is emitted from a cable to induce spurious emission. In order to avoid such problem, a crosstalk noise countermeasure in a design stage is required.

As a method of verifying a malfunction of an electronic equipment due to crosstalk noise, a method of acquiring wiring information from layout information of a print circuit board, and verifying a distance between a signal line through which a high-speed signal flows, and a signal line which is influenced by crosstalk noise is known. A wiring on the side which gives crosstalk noise will be referred to as "aggressor wiring" hereinafter, and a wiring on the side where the influence of crosstalk noise is received will be referred to as "victim wiring" hereinafter.

The following technique has been proposed. That is, a shortest distance (permissible distance) from a high-speed digital signal line is set in advance, and a signal line (neighboring wiring) which is disposed at a position closer than the permissible distance is extracted while focusing attention on a conductor pattern through which a high-speed digital signal flows. Furthermore, a length (permissible length) of the neighboring wiring is set in advance, and when a length of the extracted neighboring wiring exceeds the permissible length, that neighboring wiring is detected as a design violation.

Various problems caused by crosstalk noise occur not in an aggressor wiring but in a victim wiring. Therefore, according to the aforementioned verification method which focuses attention on an aggressor wiring, even a victim wiring which hardly causes a problem even if it is influenced by crosstalk noise may be detected, and design violations may be excessively detected.

Focusing attention on a victim wiring, there are a victim wiring which receives an influence that induces a malfunction of a semiconductor device and a victim wiring which suffers a problem of an electro magnetic interference from a cable. Especially, a victim wiring which suffers a problem of the electro magnetic interference (EMI) from a cable is normally a signal line connected to a connector. However, a large number of signal lines are connected to the connector, and signal names of the signal lines connected to the connector are often automatically appended by CAD (Computer Aided Design). For this reason, much time is required to manually extract the signal lines so as to verify the signal lines which suffer a problem of the electro magnetic interference from a cable, and are connected to the connector, thus causing extraction mistakes and extraction errors.

SUMMARY OF THE INVENTION

In one aspect, an apparatus for supporting design of an electronic equipment, comprising: an acquisition section configured to acquire design information including layout information of a print circuit board associated with the electronic equipment, and component information; an input section configured to input a verification condition associated with crosstalk noise; an extractor configured to extract information of signal lines which should verify influence of the crosstalk noise from the design information; and a detector configured to detect, based on the verification condition, a signal line, which crosses or overlaps a signal line other than the signal line corresponding to the extracted information planerly viewed from a laminating direction of layers of the print circuit board, of the signal lines corresponding to the extracted information as a victim wiring.

According to the aspect, extraction mistakes and extraction errors can be prevented upon extraction of wirings connected to a connector so as to verify victim wirings.

Further features of the present invention will become apparent from the following description of exemplary embodiments with reference to the attached drawings.

BRIEF DESCRIPTION OF THE DRAWINGS

FIG. 1 is a block diagram for explaining the arrangement of a computer apparatus which executes information processing of an embodiment.

FIG. 2 is a block diagram for explaining the functional arrangement of a design supporting program which executes the information processing of the embodiment.

FIG. 4 is a flowchart for explaining processing of a verification unit.

FIG. 12 is a view showing an example of a print circuit board including three layers.

FIGS. 14A and 14B are views for explaining a display example of a verification result.

DESCRIPTION OF THE EMBODIMENTS

Figure 3:
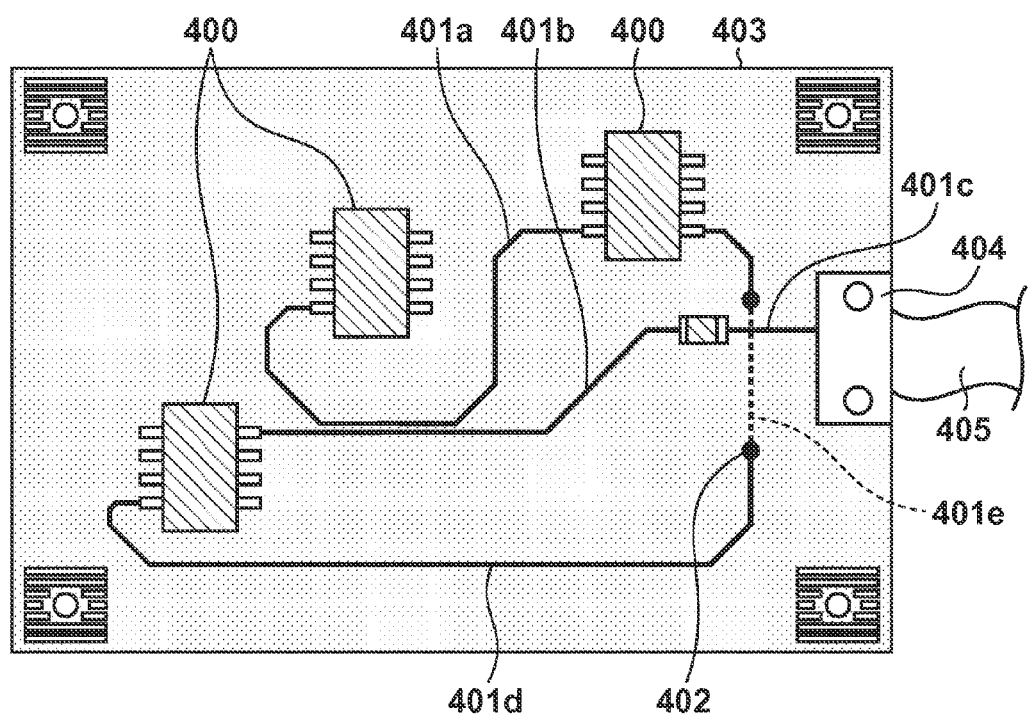
FIG. 3 is a view showing an example of layout information of a print circuit board.

A design supporting apparatus and information processing thereof according to embodiments of the present invention will be described in detail hereinafter with reference to the drawings.

First Embodiment

[Arrangement of Apparatus]

The arrangement of a computer apparatus which executes information processing of an embodiment will be described below with reference to the block diagram shown in FIG. 1.

A microprocessor (CPU) 101 controls units to be described below via a system bus 107 by executing various programs including an OS (Operating System) stored in a nonvolatile memory such as a read-only memory (ROM) 103 and a hard disk drive (HDD) 108 using a random-access memory (RAM) 102 as a work memory. Various programs stored in the HDD 108 include a print circuit board design supporting program (to be described later).

A general-purpose interface (I/F) 104 is, for example, a serial bus interface such as USB (Universal Serial Bus), and an input device 111 such as a mouse and keyboard is connected to this I/F. A video card (VC) 105 is a video interface, and a monitor 113 such as a liquid crystal display (LCD) is connected to the VC 105. A general-purpose I/F 106 is, for example, a serial bus interface such as USB, and an output device such as a printer 114 is connected to this I/F. Note that the general-purpose I/Fs 104 and 106 may be integrated.

The CPU 101 displays a user interface (UI) on the monitor 113. The user inputs an instruction and data to the UI by operating the input device 111. The CPU 101 receives a user instruction and data from the input device 111, and executes various kinds of processing by executing programs according to these inputs.

The HDD 108 stores a CAD (Computer Aided Design) program required to design an electronic equipment including a print circuit board (PCB). Furthermore, the HDD 108 stores design information (including layout information associated with a PCB) associated with design of an electronic equipment, and information associated with components used upon designing an electronic equipment (to be referred to as "component information" hereinafter). Note that the CPU 101 can read these programs and information from various recording media through a disk drive or card reader (not shown) or can acquire them from a server apparatus through a network (not shown), and can store them in the HDD 108.

Design Information

The design information includes the following pieces of information, but not all of these pieces of information are always indispensable:
  identification numbers of components (mounted components) mounted on an electronic equipment;
  mounted coordinates of mounted components;
  shapes of mounted components;
  mounted component information (mounted coordinates and shapes of pins of mounted components, shapes and signal names of conductor portions to which the pins are connected, etc.);
  component number information (to be collated with component information) required to specify mounted components;
  signal names, frequencies, rise times, and fall times of inter-component wirings;
  position coordinates of respective points which form wiring figures;
  wiring information (a net list which expresses a logical connection relationship on a circuit by component identification numbers, pin numbers, and signal names, or the like);
  information associated with the layer configuration and interlayer distance of a PCB;
  reference designator information of components (mounted components) mounted on a PCB;
  via information indicating coordinates, sizes (diameters), and the like of conductor portions which electrically connect between layers;
  drill hole information (coordinates, shapes, and the like of drill holes);
  resist information (coordinates of respective points indicating metal exposure regions, and the like);
  board outline information (coordinates of respective points which form an outline of a PCB, and the like); and
  cable information (types, lengths, wiring positions, and the like) connected to a connector.

Note that a conductor portion to which a pin of a mounted component is connected will be referred to as "pad" hereinafter. Also, wiring information of inter-component wirings includes positions and widths of wirings, coordinates of vertices (to be referred to as "forming points" hereinafter) of a figure which forms each wiring, and the like.

Component Information

The component information includes the following pieces of information and the like, but not all of these pieces of information are always indispensable. The component information can also be acquired from a component database (DB) via a network:
  component number information (information associated with components at the time of design of an electronic equipment, used to specify numbers unique to components);
  material information (indicating materials which form components);
  component name information (names such as "connector", "resistor", and "IC");
  pin information (indicating terminals such as power supply pins, ground pins, and input/output pins);
  an analysis model such as IBIS (I/O buffer information specification); and
  cable characteristics (conductor sizes, the numbers of cores, the presence/absence of shield, emission characteristic, and the like).

Note that identification information included in the design information may be handled as the component information.

[Supporting Program]

The functional arrangement of a design supporting program which executes the information processing of the embodiment will be described below with reference to the block diagram shown in FIG. 2. The design supporting program is a part of a CAD program required to design a PCB of an electronic equipment, and the functional arrangement shown in FIG. 2 is implemented when the CPU 101 executes the design supporting program.

An input unit 20 inputs various instructions and data which are input by the user by operating the input device 111 to a verification unit 22. Upon reception of an acquisition instruction of the design information and component information via the input unit 20, an information extraction unit 21 reads out the designated information from the HDD 108, and inputs the readout information to the verification unit 22. The verification unit 22 verifies a victim wiring which receives an influence that induces a malfunction of a semiconductor device, and a victim wiring which suffers a problem of an electro magnetic interference from a cable.

A CCW specifying unit 221 specifies a wiring connected to a connector (to be abbreviated as a connector connected wiring (CCW) hereinafter) based on information input from the information extraction unit 21. An MCCW specifying unit 222 specifies a wiring connected to an active component (for example, a semiconductor device such as an IC or LSI) whose malfunction is caused by crosstalk noise (to be referred to as a malfunctioning component connected wiring (MCCW) hereinafter) based on information input from the information extraction unit 21. Note that the user can input information required to specify a CCW or MCCW by operating the input unit 20.

A detection unit 223 detects a victim wiring which is likely to induce a malfunction of a semiconductor device and a victim wiring which suffers a problem of the electro magnetic interference from a cable from the CCW and MCCW based on information input from the information extraction unit 21.

An output unit 23 outputs a verification result of the verification unit 22. Note that the output of the verification result includes, for example, displaying of the verification result on the monitor 113, recording of the verification result in a predetermined area of the HDD 108, outputting the verification result to a server apparatus (not shown), and so forth.

An overview of functions implemented by the design supporting program has been described. Details of processing to be executed by the design supporting program will be described below.

Verification Processing

FIG. 3 shows an example of layout information of a print circuit board. The print circuit board shown in FIG. 3 is in a layout design completion stage, and layout information includes semiconductor device information 400, pieces of signal line information 401a to 401d of a top layer, via information 402, active component information 403, and connector information 404. A signal line, which corresponds to signal line information 401e and is indicated by the broken line, indicates that which is laid out on a layer (for example, a second layer) other than the top layer, and which is connected to a signal line corresponding to the signal line information 401d via a via corresponding to the via information 402. Note that a wiring indicated by each signal line information will be referred to as "signal line" or "wiring" hereinafter. Also, a description will often be given without distinguishing design information and a target object (for example, signal line information and a signal line).

Note that the vias are interlayer connecting members which electrically connect signal lines and ground patterns of respective layers of the print circuit board to each other. Also, to a connector, a cable 405 which connects the print circuit board and a surrounding electric component or another print circuit board or the like is connected. The layout information shown in FIG. 3 is displayed on the UI on the monitor 113 by the design supporting program.

FIG. 3 shows a simple component layout and wiring pattern for the sake of simplicity. On an actual print circuit board, a component layout and conductor pattern have a high density and are complicated, but the following description will not intend to preclude them.

The processing of the verification unit 22 will be described using the flowchart shown in FIG. 4 with reference to the layout information shown in FIG. 3.

Upon reception of an execution instruction of the verification processing of victim wirings via the input unit 20, the verification unit 22 controls the information extraction unit 21 to acquire design information and component information (S301). Next, the verification unit 22 accepts a verification condition input via the input unit 20 (S302). Note that the verification condition indicates a distance (permissible distance) between an aggressor wiring and victim wiring, which distance generates crosstalk noise that induces a malfunction of a semiconductor device and presents a problem of an electro magnetic interference from a cable. Note that when the permissible distance is input, the verification unit 22 sets it as a verification condition. However, when a permissible distance is not input, the verification unit 22 sets a given permissible distance as a verification condition. Note that a value indicating a lower limit (lower limit value) of an interlayer distance between an aggressor wiring and victim wiring may be input and set in place of the permissible distance.

Next, the verification unit 22 specifies CCWs with reference to the design information and component information (S303). The CCWs are specified by, for example, the following methods.

A component which expresses a component identification number of a connector is specified from a net list of the design information, and signal names connected to a pin of that component are specified.

A component for which specific number information of the design information and that of the component information match, and which corresponds to component name information "connector" of the component information is specified, and signal names connected to that component are specified.

A connector is specified from a component identification number of the design information, and signal lines electrically connected to the connector are specified based on position coordinates of a pin of that component and position coordinates of signal lines.

Signal lines connected to a connector are specified from signal type information indicating signal line types.

A print circuit board is specified from a wiring diagram and layout diagram of cables and three-dimensional design data of a housing of an electronic equipment, a component connected to the print circuit board via the cable is specified, and signal lines connected to the component are specified.

A connector is specified from an analysis model of multi-board analysis which analyzes between print circuit boards connected via a cable, and connection information, and signal lines connected to the specified connector are specified.

Note that the above "signal type information" includes information indicating a function of a signal line such as a clock signal and reset signal, information which expresses a connection destination (connector or semiconductor device), and information appended to a component pin or signal name. Focusing attention on signal lines which transfer identical signals, a signal line connected on the side opposite to a passive component connected to a specified CCW may be further specified.

Next, the verification unit 22 specifies MCCWs which are connected to components which cause a malfunction due to crosstalk noise with reference to the design information and component information (S304). The MCCWs can be specified by specifying, for example, signal type information (for example, a reset signal or analog signal) appended to signal lines which suffer a fatal influence of noise from the design information and component information.

After the CCWs and MCCWs are specified, the verification unit 22 selects one of these wirings as a verification wiring (S305) and calculates distances between the verification wiring and other wirings (to be referred to as "interline distances" hereinafter) (S306).

Figure 5A:
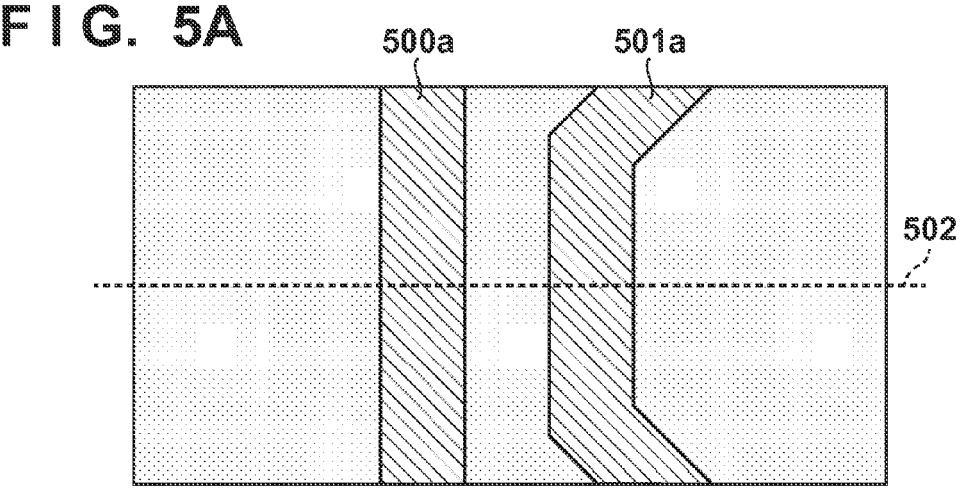
FIGS. 5A and 5B are views for explaining an interline distance.
Figure 5B:
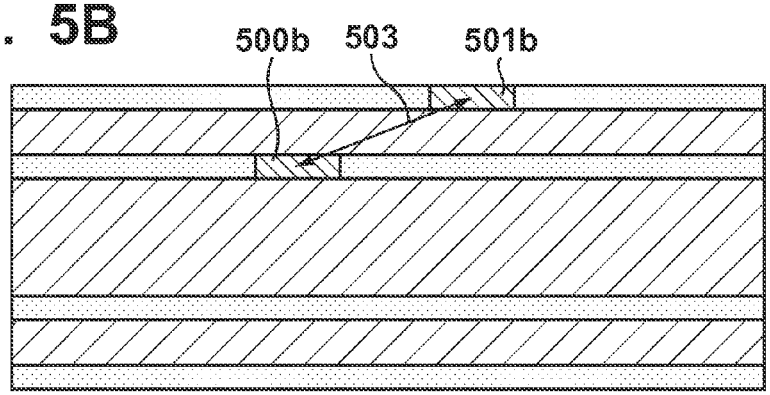

An interline distance will be described below with reference to FIGS. 5A and 5B. FIG. 5A is an enlarged view of a layout around a verification line 500a, and reference numeral 501a denotes another wiring. FIG. 5B shows a section taken along a broken line 502 shown in FIG. 5A, and reference numeral 500b denotes a section of the verification wiring 500a on a second layer; and 501b, a section of the other wiring 501a on a top layer. The interline distance is a distance 503 between the centers of the section 500b of the verification wiring and the section 501b of the other wiring. Alternatively, a distance between an edge of the section 500b of the verification wiring and that of the section 501b of the other wiring (between neighboring edges) may be set as an interline distance.

Next, the verification unit 22 compares the permissible distance as the verification condition and the interline distance (S307). If the permissible distance≥the interline distance, the verification unit 22 stores the verification wiring as a victim wiring (S308). That is, if the interline distance is equal to or smaller than the permissible distance, the verification wiring is set as a victim wiring. Information indicating the victim wiring includes, for example, signal names of the victim wiring and another wiring (aggressor wiring), position coordinates where the victim wiring is detected, shape information, interline distance, and the like.

Figure 6:
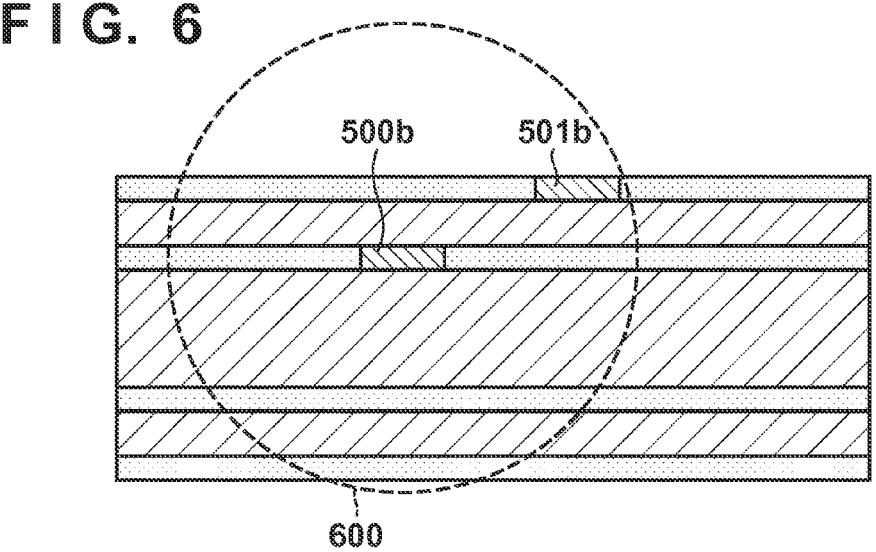
FIG. 6 is a view for explaining another verification method of a victim wiring.

Another verification method of a victim wiring will be described below with reference to FIG. 6. That is, when the verification unit 22 detects another signal line within a range 600 of the permissible distance from the center of the section 500b of the verification wiring shown in FIG. 6 in steps S306 and S307, it determines the verification wiring 500a as a victim wiring.

Next, the verification unit 22 checks whether or not all of specified CCWs and MCCWs have been verified (S309). If wirings to be verified still remain, the process returns to step S305 to select a next verification wiring. When all of the specified CCWs and MCCWs have been verified, the verification unit 22 outputs a detection result (verification result) of victim wirings to the output unit 23 (S310).

Display of Verification Result

Figures 7A, 7B:
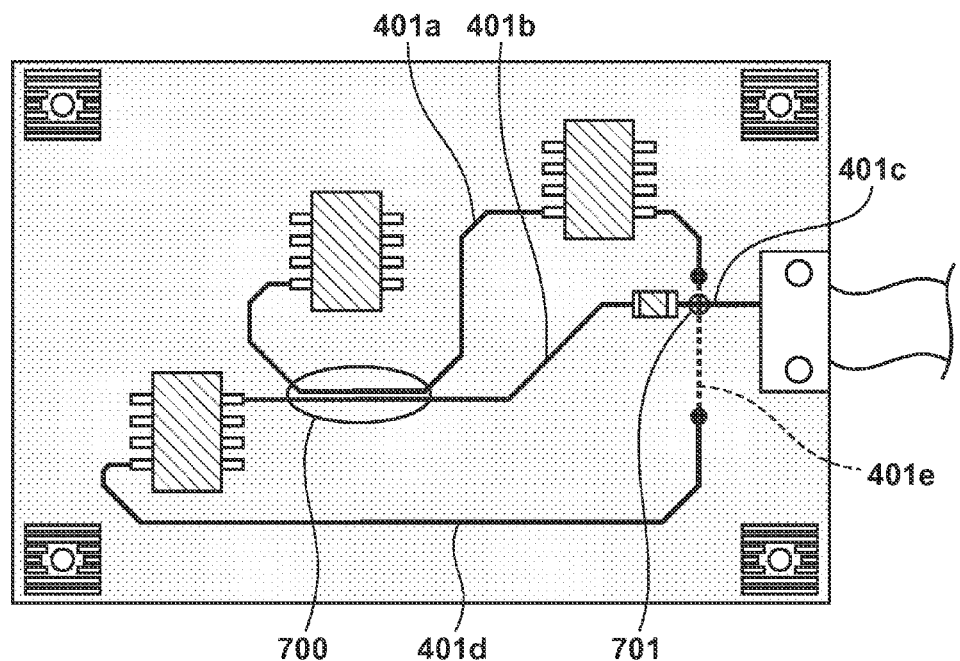
FIGS. 7A and 7B are views for explaining a display example of a verification result.

A display example of the verification result will be described below with reference to FIGS. 7A and 7B. When it is determined that the interline distance between the signal lines 401a and 401b is equal to or smaller than the permissible distance, the output unit 23 displays, for example, a FIG. 700 (an oval in the example of FIG. 7A), which indicates an overview of a range in which the interline distance between these wirings is equal to or smaller than the permissible distance, on a layout screen, as shown in FIG. 7A. Also, when it is determined that the interline distance (interlayer distance) between the signal lines 401c and 401e is equal to or smaller than the permissible distance, the output unit 23 displays, for example, a FIG. 701 (a circle in the example of FIG. 7A) indicating an intersection between these wirings on the layout screen.

Alternatively, the verification result in the form of a table shown in FIG. 7B may be displayed. FIG. 7B shows that wirings having signal names "RST0" and "CNT1" are detected as victim wirings. Also, FIG. 7B shows position coordinates and wiring layers of these victim wirings, signal names, position coordinates, and wiring layers of other wirings (aggressor wirings), and interline distances. Of course, when the user selects a signal line name displayed in the form of the table by clicking, the corresponding wiring on the layout screen is visually displayed using highlight display, zoom-up display, popup display, and the like.

When no victim wiring is detected, the output unit 23 displays a message indicating that "no victim wiring is detected".

In the processes of steps S306 and S307, the detection example of the victim wiring by comparing the interline distance and permissible distance has been explained. However, with reference to a frequency, rise time, and fall time included in the design information, only when a high-speed signal flows through the other wiring, verification may be executed. A frequency, rise time, and fall time of a signal which flows through the other wiring may be added to the output verification result, thus allowing the user to easily judge an importance level of the detection result.

Furthermore, in case of the CCW, the emission characteristics of a cable connected to a connector may be taken into consideration. That is, when the CCW neighbors another wiring, whether or not a frequency corresponding to high emission efficiency of the cable and that of a signal flowing through the other wiring match or neighbor is determined based on the relationship between the length and emission frequency characteristics of the cable and the frequency of the signal. When the frequency corresponding to the high emission efficiency of the cable matches or neighbors that of the signal, that CCW is detected as a victim wiring. Of course, the frequency corresponding to the high emission efficiency of the cable and that of the signal may be added to the verification result to be output.

Furthermore, in addition to the length of the cable, the distance between the cable and housing, a slit shape on the housing side, and the relationship between the type and emission frequency characteristics of the cable may be taken into consideration. Also, the emission frequency characteristics of the housing an electromagnetic field simulation or the like may be taken into consideration.

In this manner, by detecting and verifying victim wirings while focusing attention on wirings in which various problems caused by crosstalk noise may occur, even a victim wiring in which a problem hardly occurs even if that wiring is influenced by crosstalk noise can be prevented from being detected. As a result, excessive detection of design violations can be eliminated. By setting all the CCWs as verification wirings, the CCWs need not be manually detected, thus preventing detection mistakes and detection errors.

Second Embodiment

Information processing according to the second embodiment of the present invention will be described below. Note that the same reference numerals in the second embodiment denote the same components as those in the first embodiment, and a detailed description thereof will not be repeated.

The first embodiment has explained the verification processing of victim wirings while focusing attention on wirings in which various problems caused by crosstalk noise may occur. The second embodiment will explain verification processing which can verify victim wirings more accurately while focusing attention on a mechanism of electro magnetic interference from a cable and a mechanism that induces a malfunction of a semiconductor device.

Figure 8:
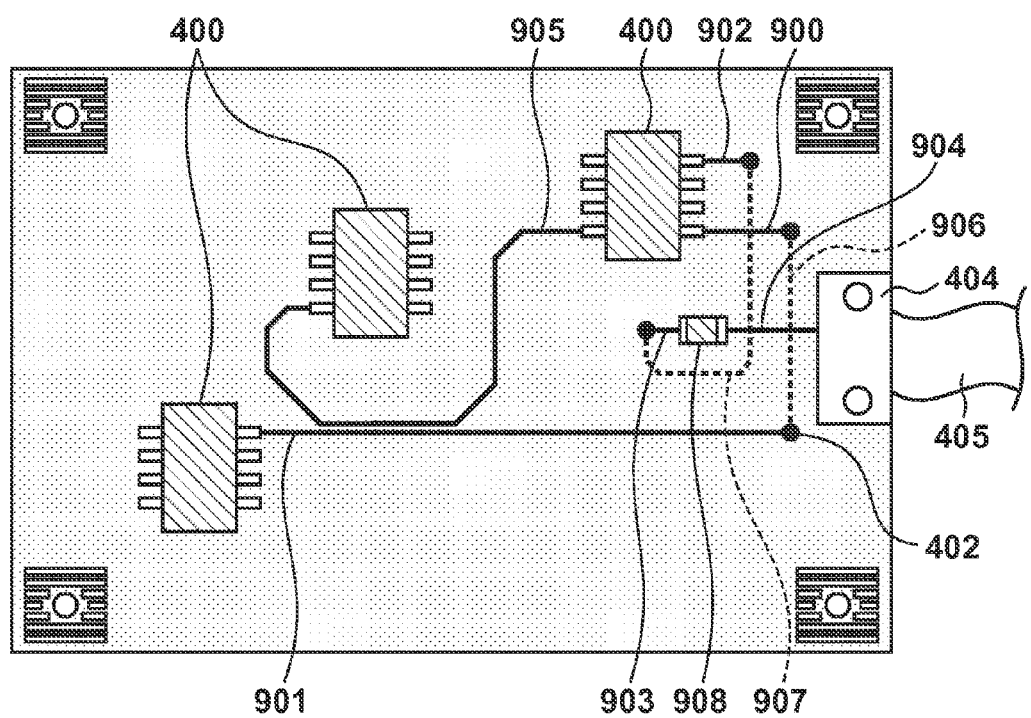
FIG. 8 is a view showing an example of layout information of a print circuit board.

FIG. 8 shows an example of layout information of a print circuit board. The print circuit board shown in FIG. 8 is in a layout design completion stage, and the layout information includes semiconductor device information 400, pieces of signal line information 900 to 905 of a top layer, via information 402, passive component information 908, and connector information 404. Signal line information 906 indicated by a broken line indicates a signal line, which connects the signal lines 900 and 901 via the vias 402, and is laid out on a layer (for example, a second layer) other than the top layer. Likewise, signal line information 907 indicated by a broken line indicates a signal line, which connects the signal lines 902 and 903 via the vias 402, and is laid out on the layer other than the top layer.

Figure 9:
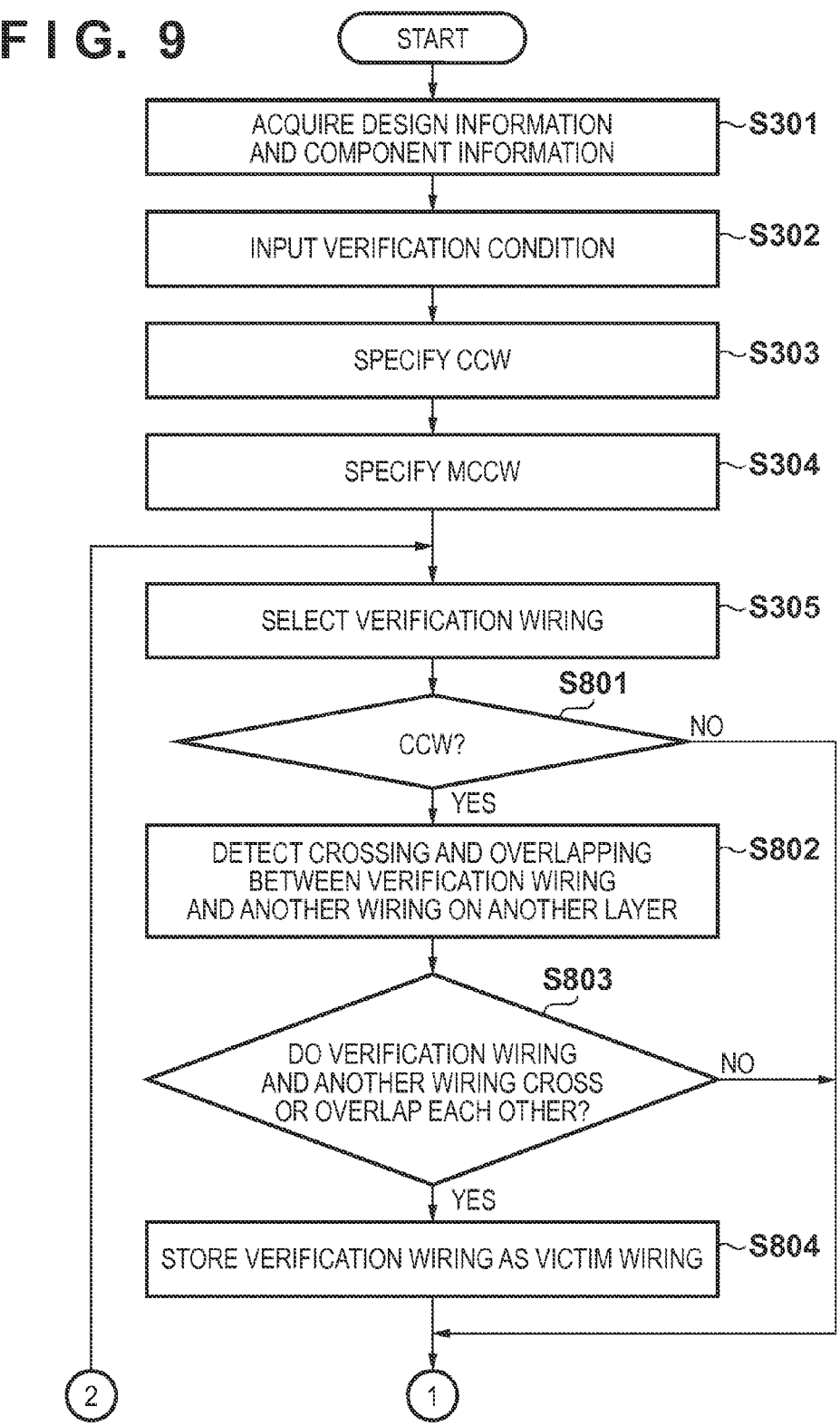
FIGS. 9 and 10 are flowcharts for explaining processing of a verification unit according to the second embodiment.
Figure 10:
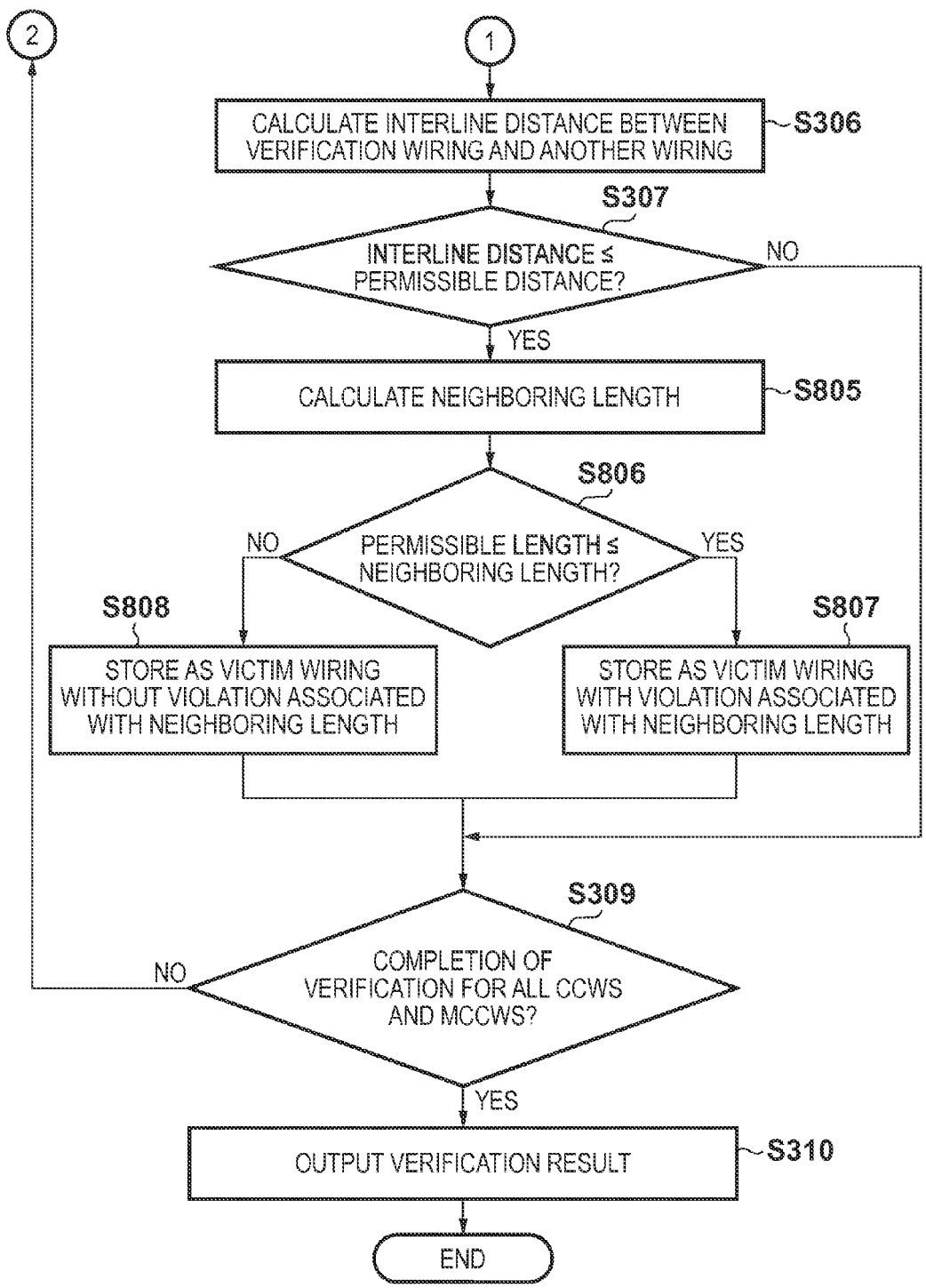

The processing of the verification unit 22 will be described below using the flowcharts shown in FIGS. 9 and 10 with reference to the layout information shown in FIG. 8.

The verification unit 22 accepts a verification condition input via the input unit 20 (S302) as in the first embodiment.

As the verification condition in the second embodiment, in addition to the permissible distance, a length (permissible length) of a (neighboring) victim wiring or aggressor wiring having an interline distance equal to or smaller than the permissible distance is input. Note that when the permissible length is input, the verification unit 22 sets that permissible length as the verification condition. However, when no permissible length is input, the verification unit 22 sets a permissible length of a given value as the verification condition.

Note that in place of the permissible length, a value indicating an upper limit (upper limit value) of a length of a wiring in a neighboring state in which the interline distance is less than a lower limit value may be input and set. Alternatively, an empirical value or experimental value of a length in a neighboring state of the victim wiring and aggressor wiring in which problems caused by crosstalk noise readily occur may be set as the permissible length (or upper limit value).

After the verification unit 22 selects a verification wiring (S305), it determines a type of the verification wiring (S801). If the verification wiring is an MCCW, the process jumps to step S306.

If the verification wiring is a CCW, the verification unit 22 detects crossing and overlapping between the verification wiring and another wiring on another layer, and stores that position information (S802). Then, the verification unit 22 checks whether or not the other wiring exists on a layer (for example, a second layer with respect to the top layer) which neighbors the layer on which the verification wiring exists, and they cross or overlap each other (S803). If the verification unit 22 determines that the verification wiring crosses or overlaps the other wiring, it stores the verification wiring as a victim wiring (S804).

Figure 11A:
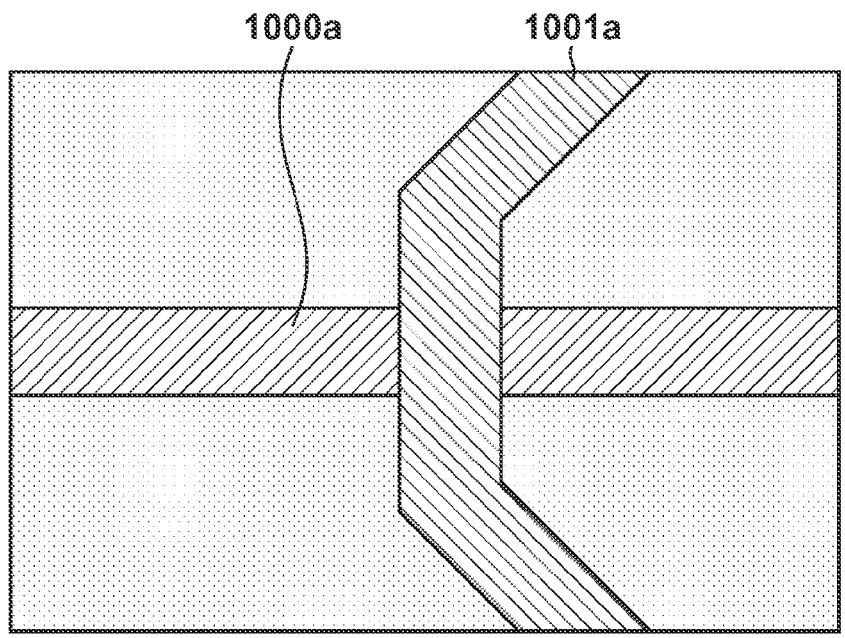
FIGS. 11A and 11B are views for explaining determination of crossing and overlapping.
Figure 11B:
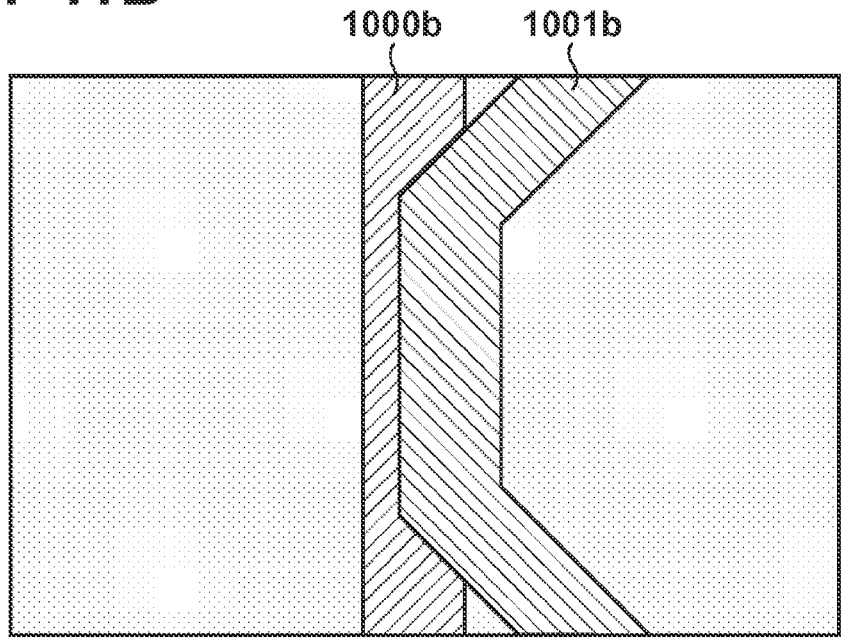

Determination of crossing and overlapping will be described below with reference to FIGS. 11A and 11B. Referring to FIG. 11A, a signal line 1001a exists on the top layer, a signal line 1000a exists on the neighboring layer, and the signal lines 1000a and 1001a cross each other. In this case, it is determined that the signal lines "cross" each other. Also, referring to FIG. 11B, a signal line 1001b exists on the top layer, a signal line 1000b exists on the neighboring layer, and the signal lines 1000b and 1001b partially overlap each other. In this case, it is determined that the signal lines "overlap" each other.

It is often desirable to determine crossing and overlapping with a signal line on a layer other than the neighboring layer. FIG. 12 shows an example of a print circuit board including three layers. A signal line 1101a is wired on a top layer 1101, and a signal line 1103a is wired on a third layer 1103. A second layer 1102 is a conductor layer such as an electrostatic shield layer, and includes a region 1102a without any conductor pattern at its central portion. In this manner, if there is no conductor pattern between the wiring 1101a on the top layer and the wiring 1103a on the third layer, it is desirable to detect crossing and overlapping between the wirings 1101a and 1103a.

In FIG. 8, an identical signal flows through the signal line 904 and a signal line 907, but a passive component 908 for the purpose of noise reduction (noise reduction component) is connected in series with these signal lines. That is, a signal flowing through the signal line 907 is that before noise reduction, and a signal flowing through the signal line 904 is that after noise reduction. In such case, when the signal lines 904 and 907 cross each other, crosstalk noise may be generated in the signal after noise reduction of the signal line 904 to emit noise from a cable 405. For this reason, it is preferable to detect crossing and overlapping of the same wiring before and after passage of the noise reduction component.

When a wiring (for example, the wiring 907) through which a signal before noise reduction flows is included in a CCW, and that wiring is selected as a verification wiring, a portion where it is determined that the wiring and another wiring (for example, the wiring 900) cross or overlap each other may be excluded from the determination result. That is, it is considered that even when crosstalk noise is induced from the wiring 900 to the wiring 907, it is removed by the passive component 908, and crosstalk noise emitted from the cable 405 is sufficiently small.

In this manner, a victim wiring crosses or overlaps a signal line other than the victim wiring planerly viewed from a laminating direction of layers of the print circuit board on a wiring layer which neighbors a wiring layer on which the victim wiring is wired of the print circuit board.

Next, the verification unit 22 calculates an interline distance between the verification wiring and another wiring (S306) and compares the interline distance and permissible distance (S307) as in the first embodiment. If the interline distance the permissible distance, the verification unit 22 calculates a length of a range (to be referred to as a "neighboring length" hereinafter) in which the interline distance is equal to or smaller than the permissible distance (S805).

Figure 13:
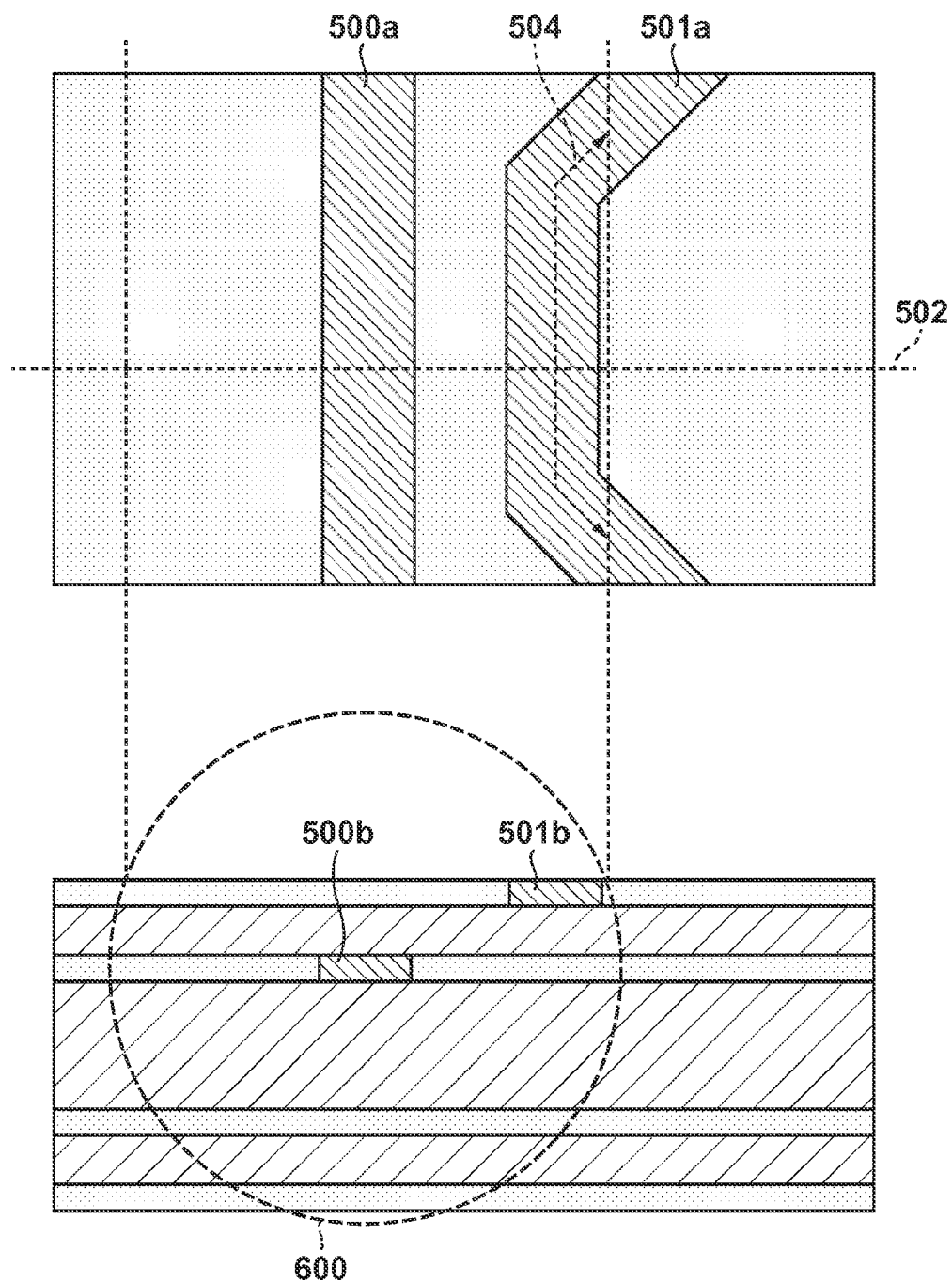
FIG. 13 is a view for explaining a neighboring length.

The neighboring length will be described below with reference to FIG. 13. A circle 600 indicates a range of the permissible distance with respect to a section 500b of a wiring 500a on the second layer. A wiring 501a (section 501b) on the top layer exists within the circle 600, and a length 504 of a central portion of the wiring 501a which exists at the permissible distance is the neighboring length. Note that a length (larger one) of an edge of the wiring 501a which exists at the permissible distance may be set as the neighboring length.

Next, the verification unit 22 compares the neighboring length and permissible length (S806). If the permissible length≤the neighboring length, the verification unit 22 stores the verification wiring as a victim wiring with a violation associated with the neighboring length (S807); if the permissible length>the neighboring length, it stores the verification wiring as a victim wiring without any violation associated with the neighboring length (S808). Note that as information indicating the victim wiring, the neighboring length is added, needless to say.

Then, the verification unit 22 checks whether or not verification for all CCWs and MCCWs is complete (S309) as in the first embodiment. If the verification is complete, the verification unit 22 supplies the detection result (verification result) of victim wirings to the output unit 23 (S310), thus ending the processing.

Display of Verification Result

A display example of the verification result will be described below with reference to FIGS. 14A and 14B. When it is determined that the interline distance between the signal lines 906 and 904 is equal to or smaller than the permissible distance, the output unit 23 displays, for example, a FIG. 1400 (a circle in the example of FIG. 14A) indicating an intersection between these wirings on the layout screen, as shown in FIG. 14A.

Figure 14A:
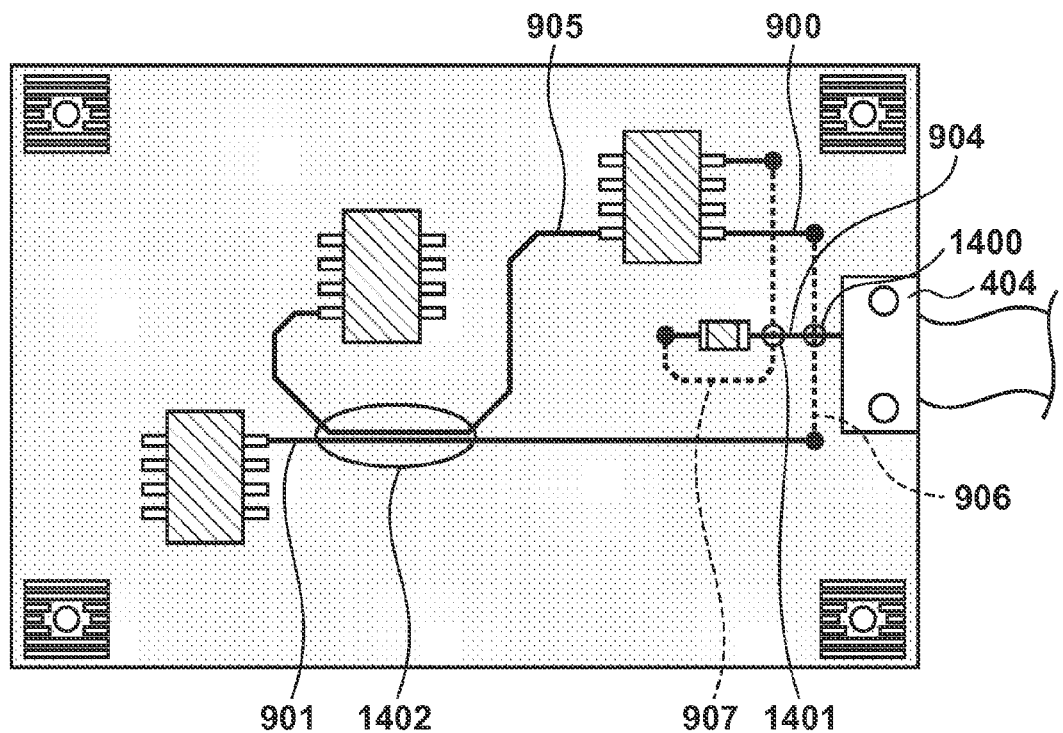

When a crossing portion between the signal line 904 after noise reduction and the signal line 907 before noise reduction is determined as a violation, the output unit 23 displays, for example, a FIG. 1401 (a circle in the example of FIG. 14A) indicating an intersection between these wirings on the layout screen, as shown in FIG. 14A.

When it is determined that the signal lines 901 and 905 neighbor, the output unit 23 displays, for example, a FIG. 1402 (an oval in the example of FIG. 14A) indicating a neighboring range of these wirings on the layout screen, as shown in FIG. 14A. Then, the output unit 23 displays the presence/absence of a neighboring length violation (for example, the figure is displayed in red in case of a neighboring length violation or in blue in case of no neighboring length violation).

Alternatively, the verification result in the form of a table may be displayed, as shown in FIG. 14B. FIG. 14B shows that wirings having signal names "RST00" and "CNT11" are detected as victim wirings. Also, FIG. 14B shows position coordinates and wiring layers of these victim wirings, signal names, position coordinates, and wiring layers of other wirings (aggressor wirings), violation types, interline distances, neighboring lengths, and the presence/absence of a neighboring length violation. Of course, when the user selects a signal line name displayed in the form of the table by clicking, the corresponding wiring on the layout screen is visually displayed using highlight display, zoom-up display, popup display, and the like.

When no victim wiring is detected, the output unit 23 displays a message indicating that "no victim wiring is detected".

According to the aforementioned embodiments, excessive detection upon detection of a victim wiring influenced by crosstalk noise can be prevented. Also, extraction mistakes and extraction errors can be prevented upon extraction of wirings connected to a connector so as to verify victim wirings.

Modification of Embodiments

The aforementioned embodiments have explained the verification examples of victim wirings of the print circuit board in the layout design completion stage. However, verification can be dynamically executed in a layout design stage. The dynamic verification will be explained below with reference to FIG. 15.

Figure 15:
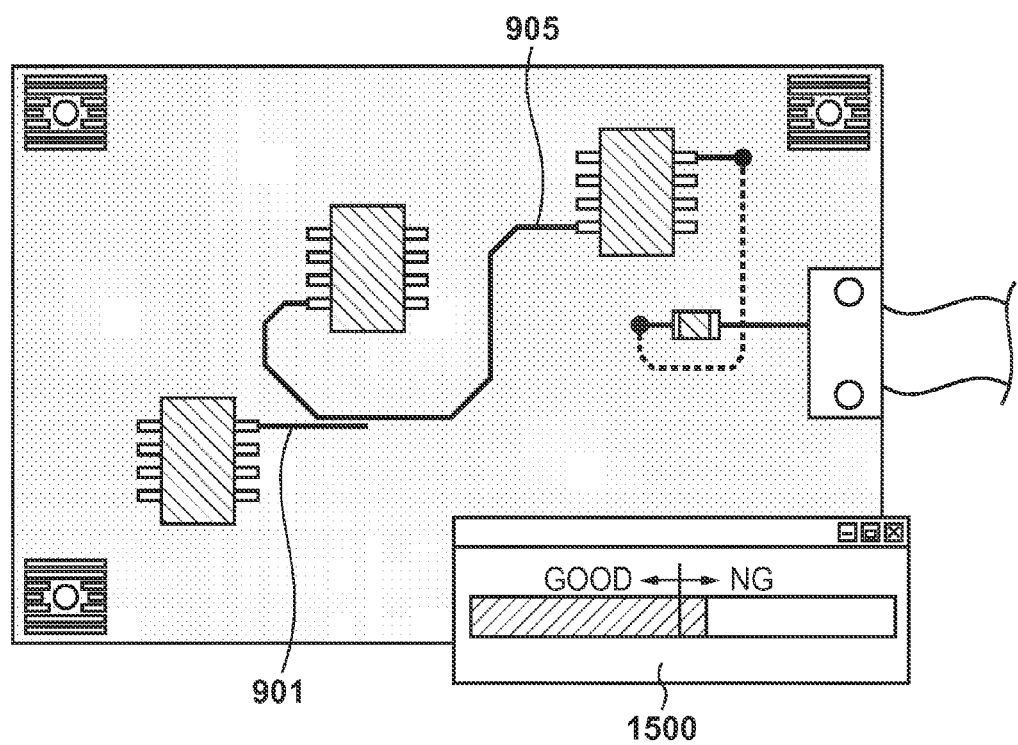
FIG. 15 is a view for explaining dynamic verification.

In a layout shown in FIG. 15, the user is drawing the wiring 901. The verification unit 22 checks an interline distance, neighboring length, and crossing between the wiring 901 and another wiring (for example, the wiring 905), and controls the output unit 23 to display a window 1500.

When the interline distance between the wiring 901 and the other wiring (for example, the wiring 905) is equal to or smaller than the permissible distance, if a neighboring state of these wiring is shorter than the permissible length set as the verification condition, a bar displayed on the window 1500 falls within a "GOOD" zone. If the permissible length is exceeded, the bar falls within an "NG" zone.

The aforementioned embodiments have explained the connector to coupled with a cable which is used to electrically connect between the PCB and at least one another member of an electronic equipment such as a PCB, console, display panel, sensor, motor driver, actuator, mechanical device or the like. However, the present invention may be applied to connectors coupled with a wire or cable which is used to electrically connect between two wirings on a PCB. In this case, the MCCW specifying unit 222 also specifies a wiring which connects such connector with the active component as a MCCW based on information input from the information extraction unit 21. In other words, the MCCW specifying unit 222 may specify a wiring which should verify influence of the crosstalk noise.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example through a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-265051, filed Dec. 2, 2011, which is hereby incorporated by reference herein in its entirety.

What is claimed is:

1. An apparatus for supporting design of an electronic equipment, comprising:
    an acquisition section configured to acquire design information including layout information of a print circuit board associated with the electronic equipment, and component information;
    an extractor configured to extract, based on the design information, signal lines respectively and electrically connected to pins of a connector, wherein the connector is used to electrically connect plural electronic equipment to each other through a cable; and
    a detector configured to detect a signal line from the extracted signal lines, as a victim wiring, wherein the detected signal line crosses a signal line other than the extracted signal lines in a case where it is viewed from a laminating direction of layers of the print circuit board,
    wherein the extractor further extracts signal lines before and after passage of a noise reduction component, and in a case where a first signal line after passing through the noise reduction component connected to a pin of the connector crosses a second signal line before passing through the noise reduction component, the detector detects the first signal line as the victim wiring, and
    wherein at least one of the acquisition section, the extractor, or the detector is implemented at least in part by hardware components of the apparatus.

2. The apparatus according to claim 1, wherein the extractor further extracts signal lines which electrically connect components with each other, and in a case where a first signal line connected to a pin of the connector crosses a second signal line, the detector detects the first signal line as the victim wiring.

3. The apparatus according to claim 1, further comprising an output section configured to output a region including the crossing signal lines.

4. The apparatus according to claim 1, further comprising an output section configured to output a detection result of the detector.

5. The apparatus according to claim 4, wherein the output section displays layout information indicating the victim wiring on a monitor.

6. The apparatus according to claim 4, wherein the output section displays a window indicating whether or not a wiring during design of a signal line satisfies the verification condition on a monitor.

7. An information processing method of supporting design of an electronic equipment, the method comprising:

using a processor to perform the steps of:
acquiring design information including layout information of a print circuit board associated with the electronic equipment, and component information;
extracting, based on the design information, signal lines respectively and electrically connected to pins of a connector, wherein the connector is used to electrically connect plural electronic equipment to each other through a cable; and
detecting a signal line from the extracted signal lines, as a victim wiring, wherein the detected signal line crosses a signal line other than the extracted signal lines in a case where it is viewed from a laminating direction of layers of the print circuit board,
wherein signal lines before and after passage of a noise reduction component are further extracted in the extracting step, and in a case where a first signal line after passing through the noise reduction component connected to a pin of the connector crosses a second signal line before passing through the noise reduction component, the first signal line is detected as the victim wiring in the detecting step.

8. A non-transitory computer readable medium storing a computer-executable program for causing a computer to perform an information processing method of supporting design of an electronic equipment, the method comprising the steps of:
acquiring design information including layout information of a print circuit board associated with the electronic equipment, and component information;
extracting, based on the design information, signal lines respectively and electrically connected to pins of a connector, wherein the connector is used to electrically connect plural electronic equipment to each other through a cable; and
detecting a signal line from the extracted signal lines, as a victim wiring, wherein the detected signal line crosses a signal line other than the extracted signal lines in a case where it is viewed from a laminating direction of layers of the print circuit board,
wherein signal lines before and after passage of a noise reduction component are further extracted in the extracting step, and in a case where a first signal line after passing through the noise reduction component connected to a pin of the connector crosses a second signal line before passing through the noise reduction component, the first signal line is detected as the victim wiring in the detecting step.

* * * * *